(12) United States Patent
Miwa

(10) Patent No.: US 9,170,628 B2
(45) Date of Patent: Oct. 27, 2015

(54) ENERGY-SAVINGS CONTROL SYSTEM FOR SHOWCASES, REFRIGERATORS AND FREEZERS

(75) Inventor: Kazuo Miwa, Shinjuku-ku (JP)

(73) Assignee: TECHNOMIRAI CO., LTD., Shinjuku-Ku, Tokyo (JP)

(*) Notice: Subject to any disclaimer, the term of this patent is extended or adjusted under 35 U.S.C. 154(b) by 407 days.

(21) Appl. No.: 13/822,016

(22) PCT Filed: Oct. 28, 2011

(86) PCT No.: PCT/JP2011/074919
§ 371 (c)(1),
(2), (4) Date: Mar. 11, 2013

(87) PCT Pub. No.: WO2013/061459
PCT Pub. Date: May 2, 2013

(65) Prior Publication Data
US 2013/0178997 A1 Jul. 11, 2013

(51) Int. Cl.
*G06F 1/32* (2006.01)
*F25D 29/00* (2006.01)
*F25D 21/00* (2006.01)

(52) U.S. Cl.
CPC ............ *G06F 1/3203* (2013.01); *F25D 21/006* (2013.01); *F25D 29/00* (2013.01); *F25B 2700/15* (2013.01)

(58) Field of Classification Search
CPC ..... G06F 1/3203; F25D 21/006; F25D 21/08; F25D 29/00; F25B 2700/15
See application file for complete search history.

(56) References Cited

U.S. PATENT DOCUMENTS

| 5,315,835 | A | * | 5/1994 | Park ................................. 62/80 |
| 5,483,804 | A | * | 1/1996 | Ogawa et al. .................. 62/153 |
| 5,515,692 | A | * | 5/1996 | Sterber et al. .................. 62/154 |
| 5,642,628 | A | * | 7/1997 | Whipple et al. ................ 62/186 |
| 5,711,159 | A | * | 1/1998 | Whipple, III ..................... 62/82 |

(Continued)

FOREIGN PATENT DOCUMENTS

| JP | 9-217974 A | 8/1997 |
| JP | 9-236367 A | 9/1997 |

(Continued)

OTHER PUBLICATIONS

International Search Report issued in corresponding application PCT/JP2011/074919 mailed on Jan. 24, 2012.

*Primary Examiner* — M N Von Buhr
(74) *Attorney, Agent, or Firm* — Buchanan Ingersoll & Rooney PC

(57) ABSTRACT

An energy-savings control system can control the showcase, refrigerator and freezer so that they can run with the reduced energy consumption by responding to the electric current values flowing in each respective one of the showcase, etc. A freezing-machine is provided in each respective one of the showcase, refrigerator and freezer in which the electric current values flowing in the freezing-machine may be detected at time intervals of every one minute, and the average electric current values during the continuous time period of 30 minutes may be computed from the electric current values as detected above. If it is determined that the freezing-machine's operating rate as computed above is greater than the freezing-machine's predetermined operating rate, the freezing-machine installed therein may be controlled so that the electromagnetic valve can be switched to its opened position.

4 Claims, 5 Drawing Sheets

(56) References Cited

U.S. PATENT DOCUMENTS

| | | |
|---|---|---|
| 5,809,792 A | 9/1998 | Song |
| 5,845,503 A * | 12/1998 | Choi ................................ 62/89 |
| 6,044,655 A * | 4/2000 | Ozaki et al. ..................... 62/205 |
| 6,523,358 B2 * | 2/2003 | Collins ............................ 62/156 |
| 6,606,870 B2 * | 8/2003 | Holmes et al. .................. 62/155 |
| 7,490,480 B2 * | 2/2009 | Davis et al. ..................... 62/180 |
| 8,341,970 B2 * | 1/2013 | Ouchi et al. ..................... 62/155 |
| 9,032,751 B2 * | 5/2015 | Lacey et al. .................... 62/234 |
| 2006/0242982 A1 * | 11/2006 | Swofford et al. ............... 62/248 |

FOREIGN PATENT DOCUMENTS

| | | |
|---|---|---|
| JP | 10-238920 A | 9/1998 |
| JP | 2000-329805 A | 11/2000 |
| JP | 2001-289485 A | 10/2001 |
| JP | 2003-050626 A | 2/2003 |
| JP | 2005-141403 A | 6/2005 |

* cited by examiner (a)

(b)

ENERGY-SAVINGS CONTROL SYSTEM FOR SHOWCASES, REFRIGERATORS AND FREEZERS

BACKGROUND

1. Technical Field

The present invention relates to an energy-savings control system for showcases, refrigerators and freezers, and more particularly to the energy-savings control system that allows the computer on which the energy-savings control program is running to control the operation of the showcase, refrigerator and freezer placed in the building so that those showcases, refrigerators and freezers can be run with less energy consumption (that is, with the energy-savings) and more efficiently.

In this specification, the term "freezer" is used to mean an insulated cabinet or room for storing or keeping cool foods when this term is referred to herein, and the term "freezing-machine" is used to mean an apparatus that is connected to each corresponding one of the showcase, refrigerator and freezer and is responsible for freezing foods or keeping frozen foods therein when this term is referred to herein.

2. Description of the Prior Art

Heretofore, there have been several different proposals for the energy-savings control system that allows the computer on which the energy-savings control program is running to control a plurality of particular energy consuming units installed in the building so that those particular units can be run with less energy consumption (that is, with the energy-savings) and more efficiently. In addition, there have also been several different proposals for the method or system for estimating the effect of the energy-savings that can be obtained by the energy-savings control system (See Patent Documents 1, 2 and 3 listed below, for example).

PRIOR TECHNICAL DOCUMENTS

Patent Documents

Patent Document 1: Patent Publication No. 2000-329805
Patent Document 2: Patent Publication No. 2003-50626
Patent Document 2: Patent Publication No. 2005-141403

SUMMARY OF THE INVENTION

It is said that the conventional energy-savings control system disclosed in each of the prior patent documents mentioned above allows the energy consumption to be reduced as intended and the costs required for the energy consumption to be reduced accordingly, and also allows the effect of the energy-savings thus obtained to be estimated.

It should be noted, however, that when the showcase, refrigerator and freezer are controlled by any of the conventional energy-savings control system so that they can be operated with the reduced energy consumption, they will remain yet to be improved in order to allow them to respond to the electric current value flowing in each respective one of the showcase, refrigerator and freezer, the goods selling department's temperature enthalpy and any change in the ambient environmental factor such as the external temperature.

On the contrary, it is the object of the present invention to provide the energy-savings control system that allows the showcase, refrigerator and freezer to be controlled to run with the reduced energy consumption by responding to the electric current value flowing in each respective one of the showcase, refrigerator and freezer, the good selling department's temperature enthalpy and any change in the ambient environment such as the external temperature.

The invention according to claim 1 provides an energy-savings control system for showcases, refrigerators and freezers in which the showcase, refrigerator and freezer may be defrosted at predetermined particular time intervals while they are running during the twenty-four (24) hours every day; an electromagnetic valve mounted in each respective one of the showcase, refrigerator and freezer may be controlled to be switched to its closed position; and a freezing-machine that is installed in each corresponding one of the showcase, refrigerator and freezer may be controlled so that a coolant liquid can be delivered through its coolant delivery pipe to each respective one of the showcase, refrigerator and freezer during the defrosting process, wherein the energy-savings control system is characterized by the fact that it includes:

a first temperature detecting means for detecting the temperature inside each respective one of the showcase, refrigerator and freezer;

an average electric current value computing means for detecting, at a time interval of every one minute, the electric current values flowing through said freezing-machine installed in each respective one of said showcase, refrigerator and freezer and computing the average electric current values for the continuous thirty (30) minutes from the individual electric current values as detected;

a freezing-machine's operating rate computing means for computing the freezing-machine's operating rate by dividing the average electric current values obtained by said average electric current value computing means by the particular rated electric current values for said freezing-machine for which said average electric current values have been provided;

a freezing-machine's operating rate determining means for comparing the values for the freezing-machine's operating rate obtained by said freezing-machine's operating rate computing means with the values for the freezing-machine's operating rata that has been predetermined for each of the four different seasons and for every running time zone for the freezing-machine for which the average electric current values have been provided and determining whether the values for the former operating rate are smaller or greater than the values for the latter operating rate;

a temperature determining means for determining, as the result of the comparison and determination provided by the freezing-machine's operating rate determining means, whether the temperatures in each respective one of the showcase, refrigerator and freezer in which the freezing-machine for which the average electric current values have been provided is installed and that have been detected by the first temperature detecting means when it is determined that the values for the freezing-machine's operating rate provided by the freezing-machine's operating rate computing means are greater than the values that are predetermined for the freezing-machine's operating rate by a certain value are within the predetermined temperature range or not; and an electromagnetic valve control means for controlling an electromagnetic valve mounted in each respective one of the showcase, refrigerator and freezer in which the corresponding freezing-machine for which the average electric current values have been provided is installed so that each respective electromagnetic valve can be switched to its opened position in order to allow a coolant liquid to be delivered through its delivery pipe from the freezing-machine to each respective one of the showcase, refrigerator and freezer when it is determined that the temperature inside each respective one of the showcase, refrigerator and freezer is not within the predetermined particular temperature range as the result of the determination made by the temperature determining means.

The invention according to claim 2 provides the energy-savings control system for showcases, refrigerators and freezers as defined in claim 1, wherein the energy-savings control system is characterized by the fact that it further includes:

a second temperature detecting means for detecting the temperature in the goods selling department on which the showcase is placed;

a humidity detecting means for detecting the humidity on the goods selling department on which the showcase is placed;

a goods selling department's enthalpy computing means for computing the enthalpy on the goods selling department on which the showcase is placed from the temperature as detected by the second temperature detecting means and the humidity as detected by the humidity detecting means;

an enthalpy determining means for determining whether the enthalpy as provided by the goods selling department's enthalpy computing means is within the predetermined particular enthalpy range for each of the four different seasons and for each of the different time zones; and an air conditioning equipment control means for controlling the operating condition for an air conditioning equipment disposed on the goods selling department on which the showcase is placed so that the goods selling department's enthalpy as provided by the goods selling department's enthalpy computing means can be within the predetermined particular enthalpy range when it is determined that the goods selling department's enthalpy as provided by the goods selling department's enthalpy computing means is not within the predetermined particular enthalpy as the result of the determination made by the enthalpy determining means.

The invention according to claim 3 provides the energy-savings control system for showcases, refrigerators and freezers as defined in claim 1 or claim 2, wherein the energy-savings control system is characterized by the fact that it further includes:

a third temperature detecting means for detecting the temperature in the ambient atmosphere in the environmental in which the refrigerator and freezer in particular are installed; and when the freezing-machine for which the average electric current values have been provided by the average electric current value computing means in order to allow the freezing-machine's operating rate determining means to perform the comparison and determination recited in claim 1 is installed in the refrigerator and freezer in particular, an external temperature equivalence control means for changing the freezing-machine's predetermined operating rate that is used in comparing with the freezing-machine's operating rate as provided by the freezing-machine's operating computing means to the freezing-machine's operating rate equivalent to the external temperature by making the freezing-machine's predetermined operating rate that is equivalent to the temperature as provided by the third temperature detecting means.

As an advantage of the present invention, it provides the energy-savings control system that can allow the showcase, refrigerator and freezer to run with the reduced energy consumption by responding to any changes the electric current values flowing in each respective one of the showcase, refrigerator and freezer, the goods selling department's temperature enthalpy and the ambient environmental factors such as the external temperature in the ambient environment.

BEST MODE OF EMBODYING THE INVENTION

Figure 1:
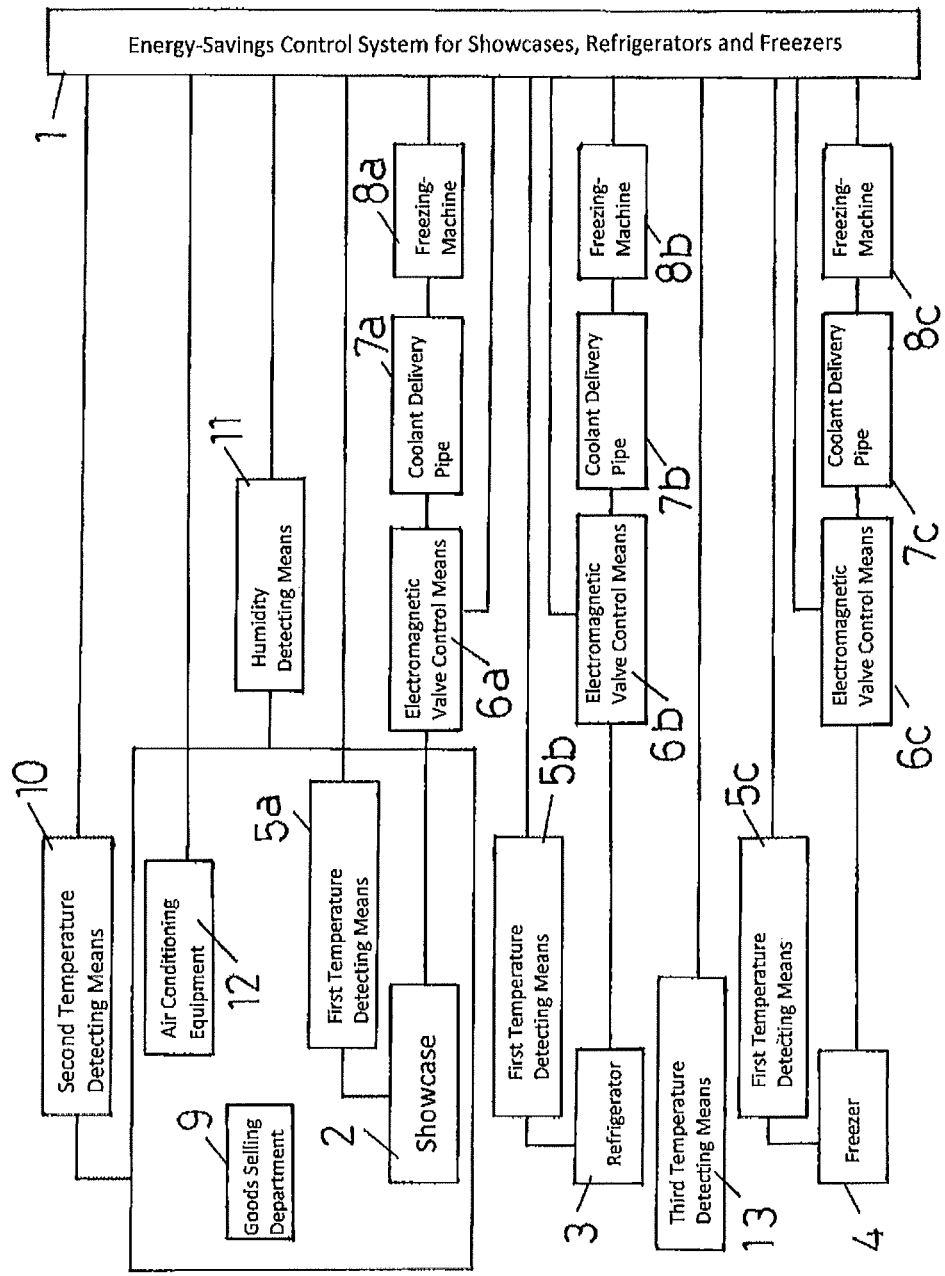
FIG. 1 is a schematic diagram that is used to explain the general arrangement of the energy-savings control system for showcases, refrigerators and freezers.

By considering the fact that the showcase, refrigerator and freezer will lose their respective cooling capability because they become frosted while they are being cooled, the defrosting process will be performed at predetermined time intervals during the twenty-four (24) hours every day. For example, the defrosting process may occur about three (3) to eight (8) times during the 24 hours every day. It is usual that the time required for the defrosting process which includes the time required for the water draining process will be set to any appropriate time between fifteen (15) minutes and forty-five (45) minutes.

The freezing-machine installed in each respective one of the showcase, refrigerator and freezer (which may be referred to hereinafter as "the showcase, etc." unless they are mentioned specifically) will be stopped during the defrosting process, and the electrical heater mounted in each respective one of the showcase, etc. or off-cycle will then be operated to melt the frost that has been accumulated there and the draining the melted water that follows the frosting process. This will raise the temperature inside each respective one of the showcase, etc. After the defrosting process and draining process are completed, the freezing-machine will be operated again so that the goods inside each respective one of the showcase, etc. can be cooled again.

As described above, the defrosting process for the showcase, refrigerator and freezer will occur at the predetermined time intervals during the 24 hours every day, and the electromagnetic valve mounted in each respective one of the showcase, refrigerator and freezer will then be controlled so that it can be switched to its closed position in order to allow the coolant liquid to be delivered through its delivery pipe from the freeing machine into the showcase, refrigerator and freezer. The processes described above may be controlled by the energy-savings control system that may follow either or both of the procedures shown in FIG. 3(a) and FIG. 3(b), for example.

Figure 3:
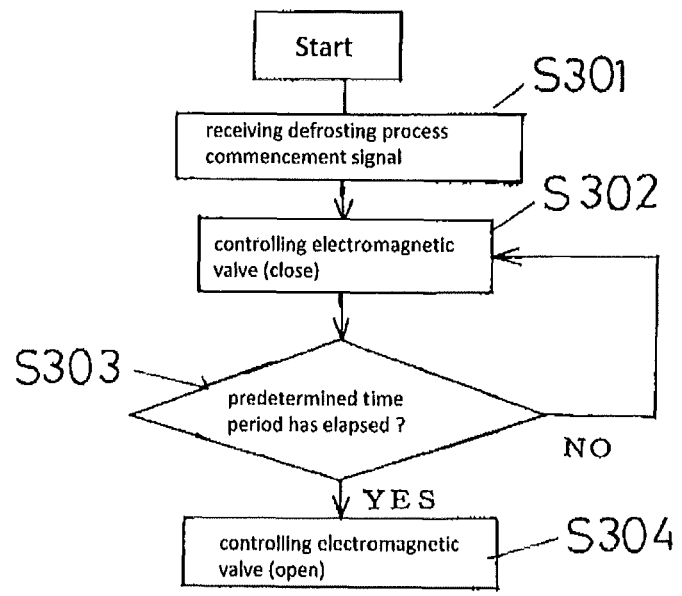
FIG. 3(a) and (b) are flow diagrams each of which illustrates the fundamental steps performed by the energy-savings control system in controlling the showcase, refrigerator and freezer so that they can run with the reduced energy consumption.
Figure 3:
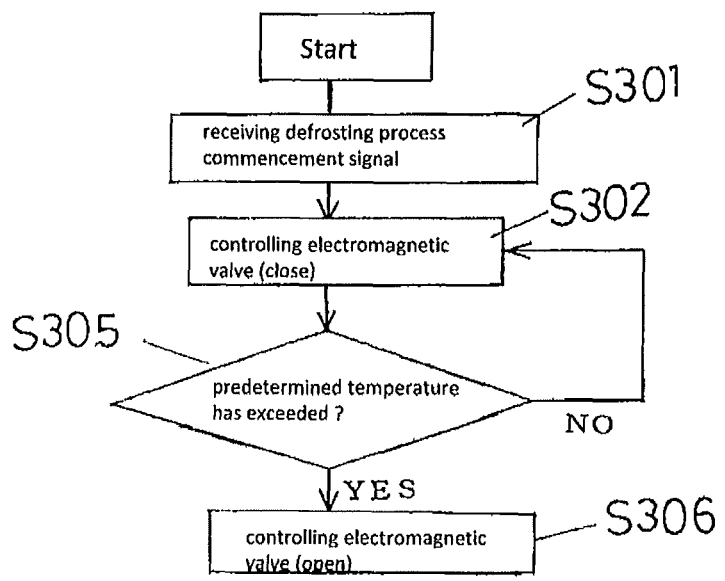

For the procedure shown in FIG. 3(a), the defrosting process commencement signal is initially received by the electromagnetic valve control means in order to inform this control means that the defrosting process has been commenced in each respective one of the showcase, etc. (S301). In response to this signal, the electromagnetic valve control means is then operated to control the electromagnetic valve in each respective one of the showcase, etc. so that it can be switched to its closed position. The delivery of the coolant liquid from the freezing-machine through its delivery pipe into each corresponding one of the showcase, etc. is then be stopped (S302). The electromagnetic valve control means keeps track of the time period following the defrosting process commencement, and determines whether the predetermined time period has elapsed (S303). If it is determined that the predetermined time period has elapsed, the electromagnetic valve control means is then controlled so that it can be switched to its opened position in order to allow the coolant liquid to be delivered from the freezing-machine through its delivery pipe into each corresponding of the showcase, etc. (S304).

For the procedure shown in FIG. 3(b), on the other hand, the electromagnetic valve control means keeps track of the temperature inside each respective one of the showcase, etc., and determines whether the temperature has exceeded the predetermined temperature for each respective one of the showcase, etc. (S305). If it is determined that the temperature has exceeded the predetermined temperature, the electromagnetic valve will be controlled so that it can be switched to its opened position in order to allow the coolant liquid to be delivered from the freezing-machine installed in each respective one of the showcase, etc. through its delivery pipe into each corresponding one of the showcase, etc. (S306).

The procedures shown in FIG. 3(a) and FIG. 3(b) may be combined so that the showcase, etc. can be controlled in accordance with both of the procedures.

In the commercial business facilities such as shops, stores and the like in which the showcase, refrigerator and freezer are placed, the amount of electrical power that is consumed by the freezing-machine installed in each respective one of the showcase, etc. may represent up to between 38% and 50% of the total power requirements that may be consumed in those commercial business facilities. For this reason, the reduction of the power requirements that may be consumed by the freezing-machine in each respective one of the showcase, refrigerator and freezer is very significant from the aspect of economy. This is also very important from the aspect of the environmental problems such as the reduction of $CO_2$ and the like.

For the showcase, refrigerator and freezer, the allowable temperature range (that is, the predetermined temperature range) is different for each of the different commercial goods that are offered or stored for sale there. Examples of those commercial goods may include fresh fish, fresh meat, vegetables and fruits, frozen goods, daily distributed products or articles that have a relatively short sale available life, are ordered every day and are delivered every day and the like.

It should be noted, however, that the temperature in the goods selling department or in the ambient environment may vary, depending on the business activity hours in the commercial business facilities such as the shops, stores and the like in which the showcase, etc. are placed, the time range for one day such as the non-business activity hours in the night and the change in the season such as summer and winter, and the load that is required for maintaining the temperature inside the showcase, etc. to be within the above described allowable temperature range (that is, the predetermined temperature range) may also vary accordingly.

The present invention addresses the problems described so far by providing the energy-savings control system for showcases, refrigerators and freezers.

The present invention provides the energy-savings control system that can control the showcase, refrigerator and freezer by following the procedure shown in FIG. 3(a) and/or the procedure shown in FIG. 3(b).

In accordance with the present invention, the energy-savings control system, which is generally designated by 1, can be performed under the control of the particular computer program running on the computer so that the showcase, refrigerator and freezer can be controlled.

As the system components which will be described specifically as below are shown in the respective schematic diagrams of FIG. 1 and FIG. 2, the energy-savings control system for showcases, refrigerators and freezers includes first temperature detecting means 5a, 5b, 5c, second temperature detecting means 10, humidity detecting means 11, third temperature detecting means 13, average electric current value computing means 21, freezing-machine's operating rate computing means 22, operating rate determining means 23, temperature determining means 24, electromagnetic valve control means 25, goods selling department's temperature enthalpy computing means 26, enthalpy determining means 27, air conditioning equipment control means 28 and external temperature equivalence control means 29.

The energy-savings control system 1 for showcases, refrigerators and freezers according to the present invention is implemented by the computer, and the average electric current value computing means 21 to the external temperature equivalence control means 29 may be performed by being controlled by the predetermined computer program that is stored in the database or like and is running on the computer.

The first temperature detecting means 5a, 5b, 5c to the third temperature detecting means 13 are provided to detect the temperature and humidity in the particular areas continuously or at the particular time intervals, and the information as detected by them may be stored for use in controlling the showcase, refrigerator and freezer by the energy-savings control system.

Each of the first temperature detecting means 5a, 5b, 5c is provided in each corresponding one of the showcase 2, refrigerator 3 and freezer 4 for detecting the temperature inside each respective one of the showcase 2, refrigerator 3 and freezer 4.

The average electric current value computing means 21 is provided for detecting, at the time interval of every one minute, the electric current value flowing in a freezing-machine installed in each corresponding one of the showcase 2, refrigerator 3 and freezer 4 and for computing the average electric current value during the continuous 30 minutes from the electric current values thus detected.

The freezing-machine's operating rate computing means 22 is provided for computing the freezing-machine's operating rate by dividing the average electric current values provided by the average electric current value computing means 21 by the rated electric current values for each corresponding one of the freezing-machines 8a, 8b, 8c for which the average electric current values have been provided by the average electric current value computing means 21..

The freezing-machine's operating rate determining means 23 is provided for comparing the freezing-machine's operating rate provided by the freezing-machine's operating rate computing means 22 with the freezing-machine's operating rate that is predetermined for each of the four different seasons and for every operating time range for each corresponding one of the freezing-machines 8a, 8b, 8c for which the average electric current values have been provided by the average electric current value computing means 21 and for determining the freezing-machine's operating rate as computed accordingly.

The temperature determining means 24 is provided for determining whether the temperature inside each respective one of the showcase 2, refrigerator 3 and freezer 4 in which each corresponding one of the freezing-machines 8a, 8b, 8c for which the average electric current values have been provided is installed and that has been detected by the first temperature detecting means 5a, 5b, 5c is within the predetermined temperature range or not, when it is determined as the result of the comparison and determination made by the freezing-machine's operating rate determining means 23 that the freezing-machine's operating rate provided by the freezing-machine's operating rate computing means 22 is greater than the freezing-machine's predetermined operating rate by a certain value.

The electromagnetic valve control means 25 is provided for controlling each respective one of the electromagnetic valves 6a, 6b, 6c mounted in each corresponding one of the showcase 2, refrigerator 3 and freezer 4 in which the corresponding freezing-machines 8a, 8b, 8c for which the average electric current values have been computed are installed so that they can be switched to the opened position to allow the coolant liquid to be delivered through the respective coolant delivery pipes 7a, 7b, 7c from the corresponding freezing-machines 8a, 8b, 8c into each respective one of the showcase 2, refrigerator 3 and freezer 4, when it is determined by the temperature determining means 24 that the temperature is not within the predetermined temperature range.

The second temperature detecting means 10 and the humidity detecting means 11 are provided for detecting the temperature and the humidity in the goods selling department 9 where the showcase 2 is placed, respectively.

The goods selling department's enthalpy computing means 26 is provided for computing the enthalpy for the goods selling department 9 where the showcase 2 is placed, based on the temperature as detected by the second temperature detecting means 10 and based on the humidity as detected by the humidity detecting means 11.

The enthalpy determining means 27 is provided for determining whether or not the goods selling department's enthalpy that is obtained by the goods selling department's enthalpy computing means 26 is within the particular enthalpy range that is predetermined for each of the four different seasons and for every operating time period.

The air conditioning equipment control means 28 is provided for controlling the operating state of the air conditioning equipment 12 installed on the goods selling department 9 where the showcase 2 is placed until the time when the goods selling department's enthalpy as computed by the goods selling department's enthalpy computing means 26 can reach the above predetermined particular enthalpy range, if it is determined that the goods selling department's enthalpy as obtained by the goods selling department's enthalpy computing means 26 is not within the predetermined particular enthalpy range.

The third temperature detecting means 13 is provided for detecting the temperature in the ambient environment where the refrigerator 3 and freezer 4 are installed.

The external temperature equivalence control means 29 is provided for changing the freezing-machine's operating rate that is predetermined for use in comparing with the freezing-machine's operating rate as obtained by the freezing-machine's operating rate computing means 22 to the freezing-machine's predetermined operating rate that is that is equivalent to the external temperature by making the external temperature equivalent to the temperature as provided by the third temperature detecting means 13, when each corresponding one of the freezing-machines 8b, 8c for which the average electric current values have been computed is installed in each respective one of the refrigerator 3 and the freezer 4 in order to allow the operating rate determining means 23 to make the above the comparison and determination.

Figure 2:
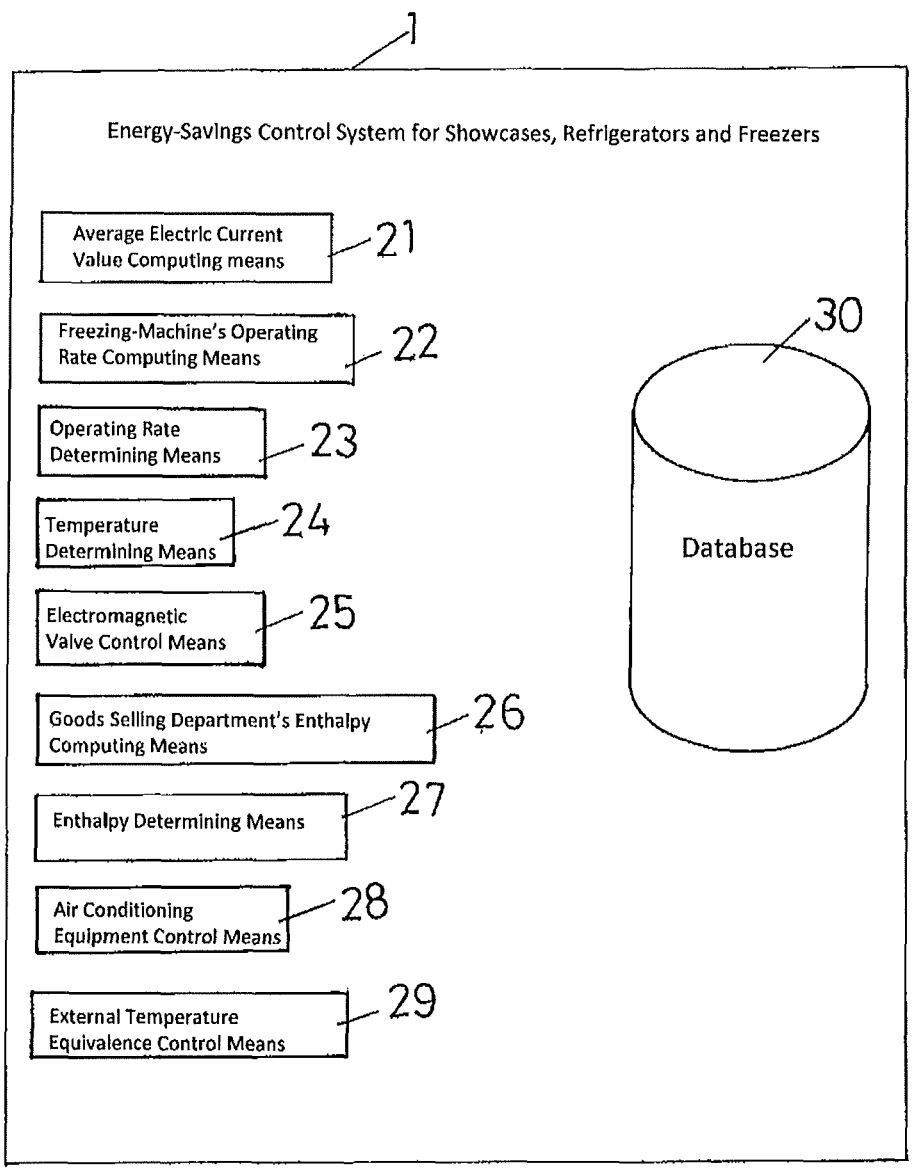
FIG. 2 a schematic diagram that is used to explain the components that are included in the energy-savings control system for showcases, refrigerators and freezers.

In FIG. 1 and FIG. 2, it is shown that the showcase 2, refrigerator 3 and freezer 4 are provided as a single one, respectively. It should be noted, however, that they may be provided as more than one, respectively, each of which may be connected to each corresponding one of the freezing-machines 8a, 8b, 8c.

In FIG. 1, it is shown that the third temperature detecting means 13 is provided as the means that is common to the refrigerator 3 and freezer 4, but the third temperature detecting means 13 may be provided separately, that is, the one for detecting the temperature in the ambient environment where the freezer 3 is installed and the one for detecting the temperature in the ambient environment where the refrigerator 4 is installed.

Figure 4:
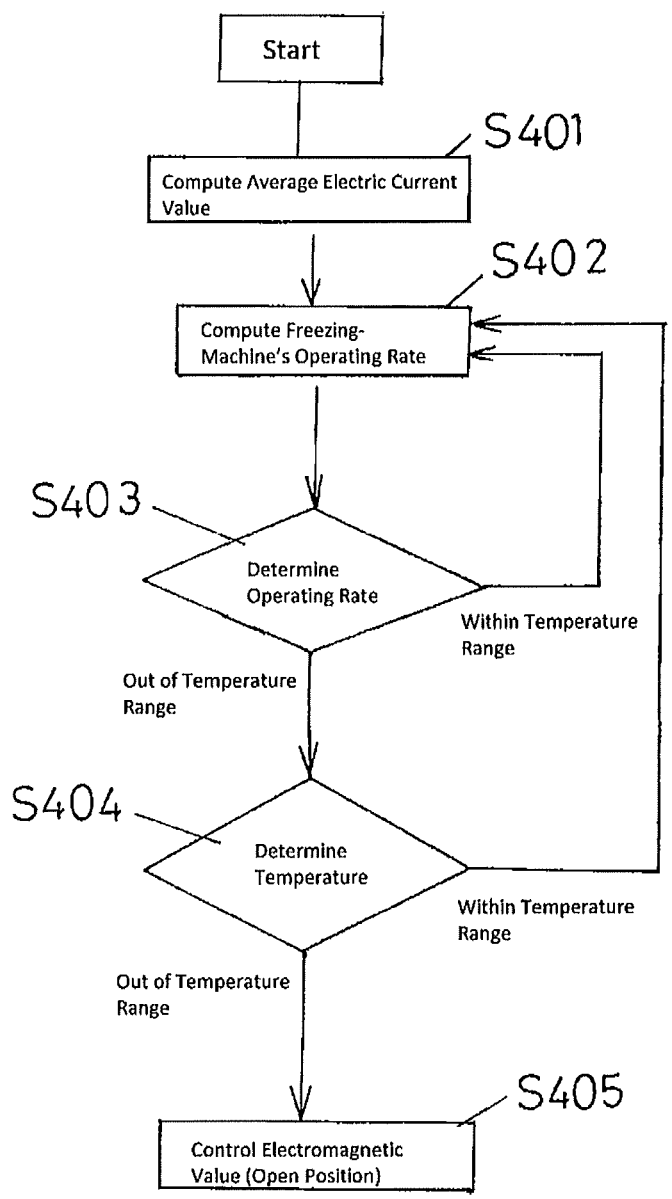
FIG. 4 is one flow diagram showing the steps followed by the energy-savings control system of the present invention in controlling the showcase, refrigerator and freezer so that they can run with the reduced energy consumption.

The following describes the procedure that is given in FIG. 4 as the blocks or steps that will be followed by the energy-savings control system 1 of the present invention in order to control the showcase, refrigerator and freezer so that they can run with the reduced energy consumption.

As the first step (S401), the average electric current value computing means 21 is operated to detect, at the time interval of one minute, the electric current value that flows in the freezing-machines 8a, 8b, 8c (which may be referred to hereinafter to the freezing-machine 8a, etc. unless they are mentioned specifically), each of which is installed in each corresponding one of the showcase 2, refrigerator 3 and freezer 4, and compute the average electric current value during the continuous 30 minutes from the individual electric current values as detected by the means 21. The average electric current value thus provided is stored in the database 30 as it is related to the information that identifies the freezing-machine 8a, etc. for which the average electric current values were computed and the time period during which the average electric current values were computed.

The average electric current values during the continuous 30 minutes may be computed by considering that the power consumption (kw) as indicated by the watt-hour meter is used to compute the power rates.

As the next following step (S402), the freezing-machine's operating rate computing means 22 computes the freezing-machine's operating rate by dividing the average electric current values provided by the average electric current value computing means 21 by the rated electric current values for each corresponding one of the freezing-machines 8a, 8b, 8c for which the average electric current values have been computed. The freezing-machine's operation rate is also stored in the database 30 or the like as it is related to the information that identifies the freezing-machine 8a, etc. for which the average electric current values have been provided and the time period during which the average electric current values have been computed.

As the next step (S403) following the step (S402), the operating rate determining means 23 compares the freezing-machine's operating rate as provided by the freezing-machine's operating rate computing means 22 with the freezing-machine's operating rate that is predetermined for each of the four different seasons and for every operating time range for each corresponding one of the freezing-machines 8*a*, 8*b*, 8*c* for which the average electric current values have been provided, and determines whether the former freezing-machine's operating rate is smaller or greater than the latter predetermined freezing-machine's operating rate.

As described previously, for the showcase 2, refrigerator 3 and freezer 4, the allowable temperature range (which is the predetermined particular temperature range) may vary, depending on each of the different commercial goods (such as fresh fish, fresh meat, vegetables and fruits, frozen foods, daily distributed goods, for example) which are stored for sale in the showcase 2, etc. The load that is required for permitting the freezing-machines 8*a*, 8*b*, 8*c* installed in each respective one of the showcase 2, etc. to maintain the predetermined temperature range to be constant may vary, depending on the business hours during which the commercial business facilities such as the shops, stores and the like operate, the time zone in one day such as the night during which there are no business activities, and the variations in the temperature at the goods selling department 9 or in the ambient environment that may vary, depending on the particular season such as summer and winter.

In response to such variations, it is determined whether the freezing-machine's operating rate is smaller or greater than the freezing-machine's operating rate that is predetermined for each corresponding one of the freezing-machine 8*a*, etc. for which the average electric current values have been provided, or more specifically, depending on whether the particular freezing-machine is installed on either of the showcase 2, etc. For example, the freezing-machine's operating rate for each of the four different seasons may also be predetermined, depending on whether the particular season is summer, winter, spring or autumn. The freezing-machine's operating rate for every operating time zone may also be predetermined for every different time zone such as the business activity hours of 10:00 to 21:00 and the non-business activity or night hours of 22:00 to 8:00 or 21:00 to 22:00.

It may be appreciated from the above that it enables the energy-savings control to be performed more minutely.

Instead of the freezing-machine's operating rate that is predetermined for each of the four different seasons or for every operating time zone, depending on whether the particular freezing-machine is installed on any one of the showcase 2, refrigerator 3 and freezer 4, the freezing-machine's operating rate may be predetermined not only for each of the four different seasons or for every operating time zone but also for each of the different commercial goods that are stored in the showcase 2, refrigerator 3 and freezer 4, depending on whether the particular freezing-machine is installed on any one of the showcase 2, refrigerator 3 and freezer 4. By employing such freezing-machine's operating rate, the energy-savings control can also be performed more minutely.

When it is determined in the step S403 that the freezing-machine's operating rate as provided by the freezing-machine's operating rate computing means 22 is greater than the freezing-machine's predetermined operating rate by a certain value, the temperature determining means 24 is then operated to compare the temperature inside the showcase 2, refrigerator 3 or freezer 4 on which the corresponding freezing-machine 8*a*, 8*b*, 8*c* for which the average electric current value has been provided is installed and that has been detected by the corresponding first temperature detecting means 5*a*, 5*b*, 5*c* with the predetermined temperature range, and determine whether the temperature is within the temperature range (S404).

For example, when the particular freezing-machine for which the average electric current values have been computed is the freezing-machine 8*a* installed on the showcase 2 and if "the operating rate computed by the freezing-machine's operating rate computing means 22 for the particular freezing-machine 8*a*" divided by "the operating rate that is predetermined for each of the four different seasons and for each of the different time zones for the particular freezing-machine 8*a* for which the average electric current value has been provided" is not within the predetermined value range, the temperature determining means 24 is then operated to compare the temperature inside the showcase 2 and which has been detected by the first temperature means 5*a* with the temperature range that is predetermined for each of the four different seasons and for each of the different time zones, and determine whether the temperature is within the predetermined temperature range.

If it is determined, as the result of the comparison and determination made by the temperature determining means 24 (S404), that the temperature is not within the predetermined temperature range (S404), the electromagnetic valve control means 25 is then operated to control the respective electromagnetic valves 6*a*, 6*b*, 6*c* mounted in the showcase 2, refrigerator 3 and freezer 4 having the corresponding freezing-machines 8*a*, 8*b*, 8*c* installed therein for which the average electric current values have been provided, so that the respective electromagnetic valves can be switched to their opened position in order to allow the corresponding freezing-machines 8*a*, 8*b*, 8*c* to deliver the coolant liquid through their respective delivery pipes 7*a*, 7*b*, 7*c* into the showcase 2, refrigerator 3 and freezer 4 (S405).

This enables the energy-savings control to be performed more minutely.

In this case, the freezing-machine's predetermined operating rate may also be replaced by the particular temperature range that is predetermined not only for each of the four different seasons and for every operating time zone but also for each of the different commercial goods that are stored in the showcase 2, refrigerator 3 and freezer 4. By employing this temperature range, the energy-savings control can also be performed more minutely.

Figure 5:
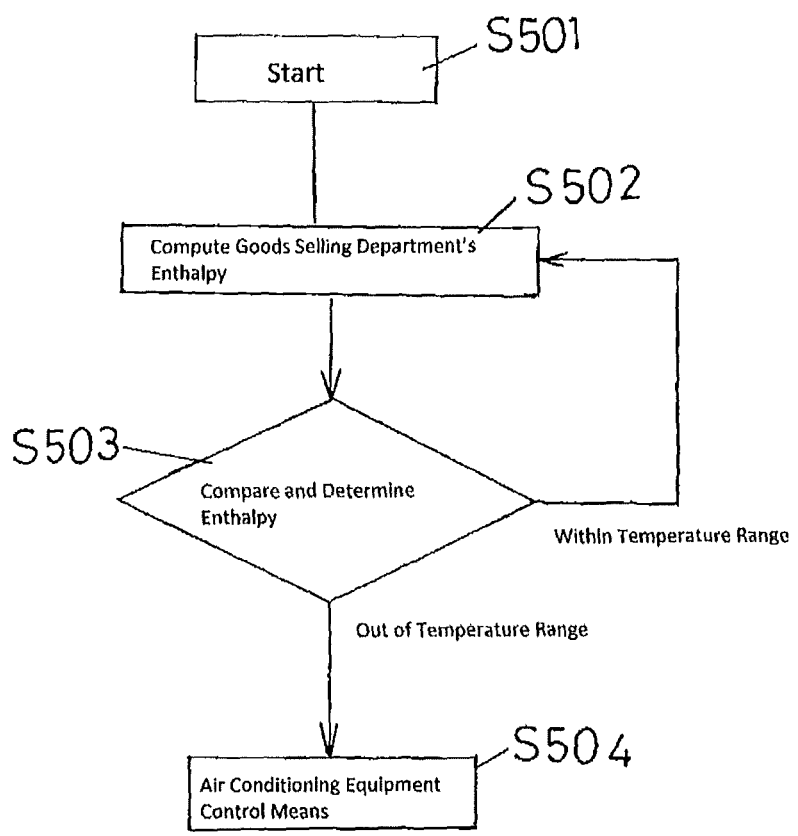
FIG. 5 is another flow diagram showing the steps followed by the energy-savings control system of the present invention in controlling the showcase, refrigerator and freezer so that they can run with the reduced energy consumption.

Referring now to FIG. 5, the energy-savings control procedure according to the present invention is described below in addition to the energy-savings control that is performed as described before by following the flowchart shown in FIG. 4.

The temperature and humidity that may occur in the goods selling department 9 where the showcase 2 is placed will be detected by the second temperature detecting means 10 and by the humidity detecting means 11, respectively. The information relating to the temperature and humidity thus detected will be stored in the database 30 or the like for the future use.

Then, the goods selling department's enthalpy computing means 26 is operated to compute the enthalpy in the goods selling department 9 where the showcase 2 is placed, based on the information relating to the temperature as detected by the second temperature detecting means 10 and the humidity as detected by the humidity detecting means 11 and which has previously been stored in the database 30 or the like (S502). The enthalpy thus provided in the goods selling department 9 where the showcase 2 is placed will be stored in the database 30 or the like as it is related to the information identifying the showcase 2 placed in the goods selling department 8 and the time period during which the enthalpy was computed.

Then, it is determined by the enthalpy determining means 27 whether or not the enthalpy provided by the goods selling department's enthalpy computing means 26 is within the particular enthalpy range that is predetermined for each of the four different seasons and for every operating time zone (S503).

Specifically, the enthalpy provided by the goods selling department's enthalpy computing means 26 is compared with the goods selling department's predetermined enthalpy range, and it is then determined whether it is smaller or greater than the predetermined enthalpy range for the goods selling department 9 where the showcase 2 is placed as well as for each of the four different seasons and for every operating time zone both of which have been described before.

If it is determined by the enthalpy determining means 27 that the goods selling department's enthalpy as provided by the goods selling department's enthalpy computing means 26 is not within the predetermined enthalpy range, the air conditioning equipment control means 28 is then operated to control the operating condition of the air conditioning equipment 12 installed in the goods selling department 9 where the showcase 2 is placed until the time when the goods selling department's enthalpy as provided by the goods selling department's enthalpy computing means 26 can reach the predetermined enthalpy range. (S504).

The energy-savings control can be performed so that any stress or load upon the showcase 2 can be reduced.

It should be noted that the enthalpy computing process that is performed at the goods selling department 9 by the goods selling department's enthalpy computing means 26 (S502) may be performed at the particular time intervals. For example, the average electric current values may be computed by the average electric current value computing means 21 (S401); the freezing-machine's operating rate may be computed by the freezing-machine's operating rate computing means 22 (S402); and the comparison and determination may be made by the freezing-machine's operating rate determining means 23 (S403). Those processes may occur at the particular time intervals of every 30 minutes. The goods selling department' enthalpy computing process (S502) may occur at any intermediate time of the 30 minutes during which the enthalpy at the goods selling department 9 may be computed by the goods selling department's enthalpy computing means 21.

In performing the energy-savings control in accordance with the flowchart shown in FIG. 4 and described before and when the respective freezing-machines 8b, 8c for which the respective average electric current values have been computed in the step S401 are installed in the refrigerator 3 and freezer 4, the energy-savings control may be performed in the sequence that will be described below.

In the present invention, the third temperature detecting means 13 is provided for detecting the temperature in the ambient environment in which the refrigerator 3 and the freezer 4 are placed.

When each of the freezing-machines 8b, 8c for which the respective average electric current values have been computed is installed on either of the refrigerator 3 and freezer 4 in making the comparison and determination by the operating rate determining means 23, the external temperature equivalence control means 29 is then operated to change the freezing-machine's predetermined operating rate that is used in comparing with the freezing-machine's operating rate as provided by the freezing-machine's operating rate determining means 22 to the freezing-machine's predetermined operating rate that will be equivalent to the external temperature by making the temperature as detected by the third temperature detecting means 13 equivalent to that predetermined operating rate.

Then, the freezing-machine's operating rate that is predetermined for each of the four different seasons, for each of the different operating rates, and depending on whether the particular freezing-machine is installed on the refrigerator 3 or the freezer 4 and further depending on each of the different commercial goods stored in the refrigerator 3 or freezer 4 will be changed to the freezing-machine's operating rate that is predetermined for each of the four different seasons, for each of the differnt operating rates and depending on each of the different commercial goods stored there and further depending on the temperature in the ambient environment in which the refrigerator 3 or the freezer 4 is placed.

The load or stress on each respective one of the freezing-machines 8b, 8c for which either of the refrigerator 3 and freezer 4 is placed may vary, depending on the temperature in the ambient environment in which the refrigerator 3 or freezer 4 is placed.

Then it may be appreciated from the above description that the energy-savings control may be performed more minutely by changing the freezing-machine's predetermined operating rate that is used in making the comparison and determination described above to the freezing-machine's predetermined operating rate by considering the temperature in the ambient environment in which either of the refrigerator 3 and the freezer 4 is placed.

In this case, it should be noted that the temperature in the ambient environment in which either of the refrigerator 3 and the freezer 4 is placed and that is detected by the third temperature detecting means 13 is compared with the predetermined temperature range, and it is then determined whether the temperature is within the predetermined temperature range or not. If it is determined that the temperature is not within the predetermined temperature range, the freezing-machine's operating rate that is used in the comparison and determination will be changed to the freezing-machine's predetermined operating rate by considering the temperature in the ambient environment in which either of the refrigerator 3 and the freezer 4 is placed as described above.

In this way, the energy-savings control can be performed more minutely.

Although the present invention has been described so far with reference to the particular preferred embodiments and examples thereof by referring to the accompanying drawings, it should be understood that the present invention is not limited to those embodiments and examples thereof but may be modified in various ways or manners without departing from the spirit and scope of the invention as defined in the appended claims.

DESCRIPTION OF REFERENCE NUMERALS

1 Energy-savings control system for showcases, refrigerators and freezers
5a, 5b, 5c First temperature detecting means
10 Second temperature detecting means
11 Humidity detecting means
13 Third temperature detecting means
21 Average electric current value computing means
22 Freezing-machine's operating rate computing means
23 Operating rate determining means
24 Temperature determining means
25 Electromagnetic valve control means
26 Goods selling department's enthalpy computing means
27 Enthalpy determining means
28 Air conditioning equipment control means
29 External temperature equivalence control means

The invention claimed is:

1. An energy-savings control system for showcases, refrigerators and freezers in which the showcase, refrigerator and freezer may be defrosted at predetermined particular time intervals while they are running during the twenty-four hours every day; an electromagnetic valve mounted in each respective one of the showcase, refrigerator and freezer may be controlled to be switched to its closed position; and a freezing-machine installed in each respective one of the showcase, refrigerator and freezer may be controlled so that a coolant liquid can be delivered through its coolant delivery pipe to each respective one of the showcase, refrigerator and freezer during the defrosting process, wherein the energy-savings control system comprises:

a first temperature detecting means for detecting the temperature inside each respective one of the showcase, refrigerator and freezer;

an average electric current value computing means for detecting, at a time interval of every one minute, the electric current values flowing through said freezing-machine installed in each respective one of said showcase, refrigerator and freezer and computing the average electric current values for the continuous thirty minutes from the individual electric current values as detected;

a freezing-machine's operating rate computing means for computing the freezing-machine's operating rate by dividing the average electric current values obtained by said average electric current value computing means by the particular rated electric current values for said freezing-machine for which said average electric current values have been provided;

a freezing-machine's operating rate determining means for comparing the values for the freezing-machine's operating rate obtained by said freezing-machine's operating rate computing means with the values for the freezing-machine's operating rata that has been predetermined for each of the four different seasons and for every running time zone for the freezing-machine for which the average electric current values have been provided and determining whether the values for the former operating rate are smaller or greater than the values for the latter operating rate;

a temperature determining means for determining, as the result of the comparison and determination provided by the freezing-machine's operating rate determining means, whether the temperatures in each respective one of the showcase, refrigerator and freezer in which the corresponding freezing-machine for which the average electric current values have been provided is installed and that have been detected by the first temperature detecting means when it is determined that the values for the freezing-machine's operating rate provided by the freezing-machine's operating rate computing means are greater than the values that are predetermined for the freezing-machine's operating rate by a certain value are within the predetermined temperature range or not; and an electromagnetic valve control means for controlling an electromagnetic valve mounted in each respective one of the showcase, refrigerator and freezer in which the corresponding freezing-machine for which the average electric current values have been provided is installed so that each respective electromagnetic valve can be switched to its opened position in order to allow a coolant liquid to be delivered through its delivery pipe from the freezing-machine to each respective one of the showcase, refrigerator and freezer when it is determined that the temperature inside each respective one of the showcase, refrigerator and freezer is not within the predetermined particular temperature range as the result of the determination made by the temperature determining means.

2. The energy-savings control system for showcases, refrigerators and freezers as defined in claim 1, wherein the energy-savings control system further comprises:

a second temperature detecting means for detecting the temperature in the goods selling department on which the showcase is placed;

a humidity detecting means for detecting the humidity on the goods selling department on which the showcase is placed;

a goods selling department's enthalpy computing means for computing the enthalpy on the goods selling department on which the showcase is placed from the temperature as detected by the second temperature detecting means and the humidity as detected by the humidity detecting means;

an enthalpy determining means for determining whether the enthalpy as provided by the goods selling department's enthalpy computing means is within the predetermined particular enthalpy range for each of the four different seasons and for each of the different time zones; and an air conditioning equipment control means for controlling the operating condition for an air conditioning equipment disposed on the goods selling department on which the showcase is placed so that the goods selling department's enthalpy as provided by the goods selling department's enthalpy computing means can be within the predetermined particular enthalpy range when it is determined that the goods selling department's enthalpy as provided by the goods selling department's enthalpy computing means is not within the predetermined particular enthalpy as the result of the determination made by the enthalpy determining means.

3. The energy-savings control system for showcases, refrigerators and freezers as defined in claim 1, wherein the energy-savings control system further comprises:

a third temperature detecting means for detecting the temperature in the ambient atmosphere in the environment in which the refrigerator and freezer are installed; and when the freezing-machine for which the average electric current values have been provided by the average electric current value computing means in order to allow the freezing-machine's operating rate determining means to perform the comparison and determination recited in claim 1 is installed in the refrigerator and freezer, an external temperature equivalence control means for changing the freezing-machine's predetermined operating rate that is used in comparing with the freezing-machine's operating rate as provided by the freezing-machine's operating computing means to the freezing-machine's operating rate that is equivalent to the external temperature by making the freezing-machine's predetermined operating rate equivalent to the temperature as provided by the third temperature detecting means.

4. The energy-savings control system for showcases, refrigerators and freezers as defined in claim 2, wherein the energy-savings control system further comprises:

a third temperature detecting means for detecting the temperature in the ambient atmosphere in the environment in which the refrigerator and freezer are installed; and when the freezing-machine for which the average electric current values have been provided by the average electric current value computing means in order to allow the freezing-machine's operating rate determining means to perform the comparison and determination recited in claim 2 is installed in the refrigerator and freezer, an external temperature equivalence control means for changing the freezing-machine's predetermined operating rate that is used in comparing with the freezing-machine's operating rate as provided by the freezing-machine's operating computing means to the freezing-machine's operating rate that is equivalent to the external temperature by making the freezing-machine's predetermined operating rate equivalent to the temperature as provided by the third temperature detecting means.

\* \* \* \* \*